United States Patent

[11] 3,524,382

| [72] | Inventor | Gerard P. Artaud<br>Torrence, California |
|---|---|---|
| [21] | Appl. No. | 704,086 |
| [22] | Filed | Feb. 8, 1968 |
| [45] | Patented | Aug. 18, 1970 |
| [73] | Assignee | R. W. Hodgson (fractional part interest)<br>Hollywood, California |

[54] ADJUSTABLE-CUTTING-RADIUS ROTARY CUTTING TOOL ATTACHMENT HEAD
9 Claims, 1 Drawing Fig.

[52] U.S. Cl.................................................. 90/11,
77/58, 29/103
[51] Int. Cl..................................................... B23c 7/00,
B23b 29/08
[50] Field of Search.................................... 90/175, 11,
11.1; 77/58.36, 58.37; 51/347; 145/127, 114;
279/6; 29/105

[56] References Cited
UNITED STATES PATENTS
847,742  3/1907  Dowling...................... 145/114

| 1,659,370 | 2/1928 | Magin.......................... | 77/58.36 |
| 2,215,344 | 9/1940 | Albrecht....................... | 145/127 |
| 2,598,477 | 5/1952 | Wilberschied................. | 77/58.36 |
| 3,144,792 | 8/1964 | Marchis........................ | 77/58.36 |

*Primary Examiner*— Gil Wiendenfeld

ABSTRACT: An adjustable-cutting-radius rotary cutting tool attachment head including a rotary base member provided, in a preferred form, with two oppositely mounted slide extension members carrying cutting tips, and with rotary-to-linear movement converting means having an output portion effectively drivingly connected with respect to each slide extension member for positively slidably moving it in a radius-increasing or radius-decreasing manner and having an input portion coupled to said output portion and manually operable for extending or retracting each slide extension member a corresponding radius-modifying positive or negative distance. A preferred form also discloses slide-extension-member locking means.

Patented Aug. 18, 1970 3,524,382
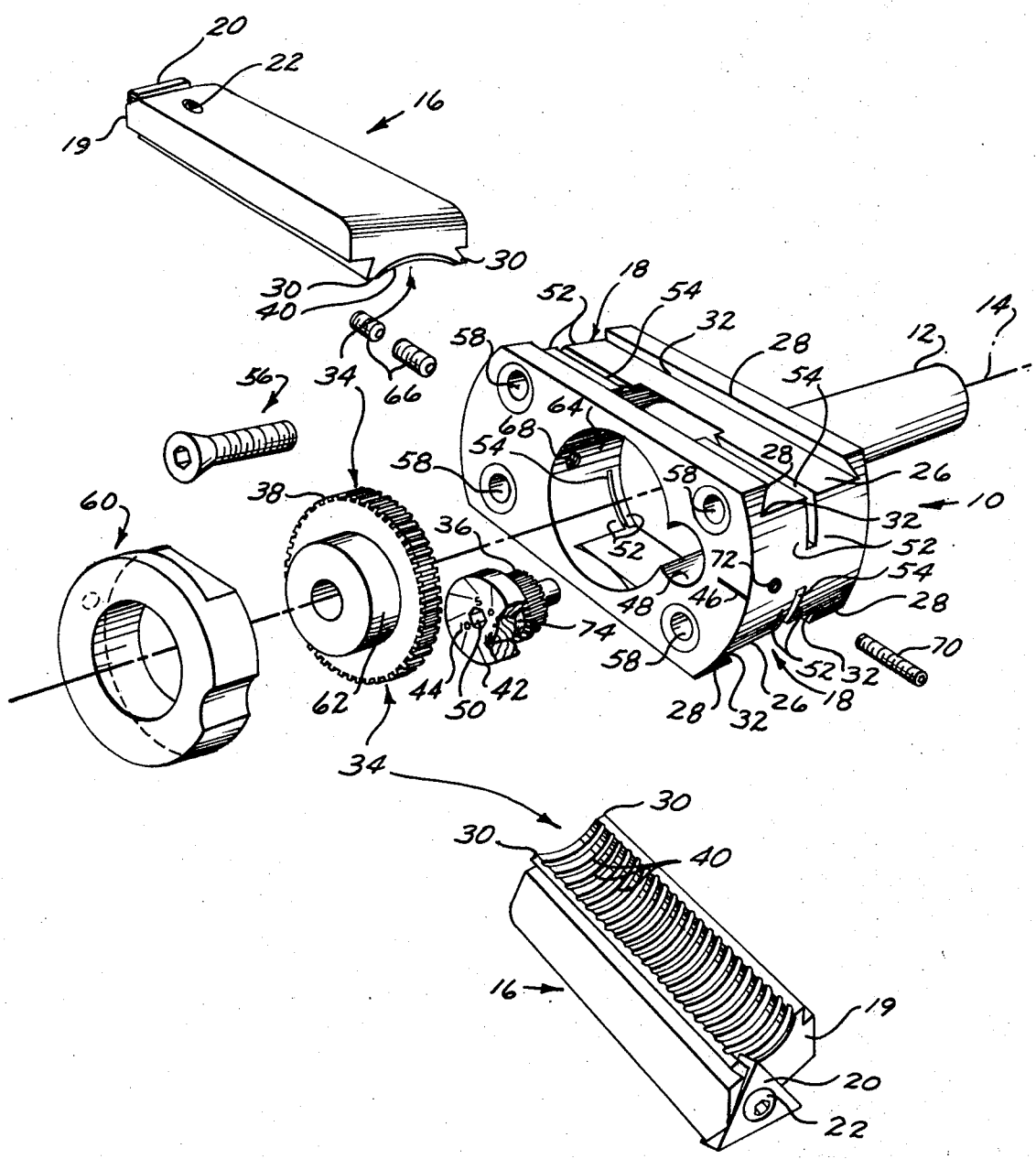
INVENTOR.
GERARD P. ARTAUD

ADJUSTABLE-CUTTING-RADIUS ROTARY CUTTING TOOL ATTACHMENT HEAD

Generally speaking, the present invention relates to an adjustable-cutting-radius rotary cutting tool attachment head which, in a preferred form, is provided with one or more removable, interchangeable, and replaceable cutting element inserts made of extremely hard material, such as tungsten carbide or any substantial equivalent, and which comprises a rotary base member having a perpendicular shank or shaft adapted to be engaged and driven by a machine tool or metal working machine, and with said rotary base member being provided with one or more slideway means, each slidably mounting a corresponding slide extension member in a manner such that a forward cutting end thereof may be moved outwardly in a cutting-radius-increasing direction or inwardly in a cutting-radius-decreasing direction - - this outward or inward movement being accomplished by slide-driving means having an output portion drivingly coupled with respect to each such slide extension member and having a manually operable input portion which can be operated so as to cause said outward or inward movement of each such slide extension member. Usually, the input member just referred to is of a manually operable micrometer type provided with scale and index means calibrated in terms of the increase or decrease in the cutting radius between the cutting element insert carried by the forward cutting end of each such slide extension member and the center of rotation of the rotary base member and the perpendicular shank or shaft carried thereby and adapted to be power-driven by a machine tool or a metal working machine. Locking means is provided for effectively locking each such slide member, and the slide-driving means coupled thereto, in any selected adjusted position so that the rotary cutting tool attachment head may be used for cutting purposes when in said locked adjusted position. However, the locking means can be very simply unlocked to allow adjustment of the cutting radius for a subsequent cutting operation.

It should be noted that the novel adjustable-cutting-radius rotary cutting tool attachment head of the present invention can be set to any desired cutting radius to result in a cutting operation of an exactly predetermined extent. In other words, this allows programming of a sequence of cutting operations so that one or more identical parts can be produced in sequence thereby.

It should also be noted that the novel adjustable-cutting-radius rotary cutting tool attachment head of the present invention can be used for initial rough cut work by setting the scale and index means at one setting, and then can be used for finish cut work by making a further very slight readjustment of the micrometer input portion and the scale and index means controlled thereby.

The novel adjustable-cutting-radius rotary cutting tool attachment head of the present invention can be used in a variety of different types of machine tools and metal working machines, and the cutting tool attachment head itself may be modified and used in a variety of different ways so as to effectively comprise a milling cutter, a shell mill, a fly cutter, or a variety of other types of cutting tools.

The novel adjustable-cutting-radius rotary cutting tool attachment head of the present invention may be modified as to the number of slide extension members. In fact, these may vary from one to a very substantial number of same, depending upon the purposes to which the cutting tool attachment head is to be put.

It should be noted that the novel adjustable-cutting-radius cutting tool attachment head of the present invention may be used in lieu of a considerable number of different sizes of prior art cutting tool attachment heads and, thus, one of such attachment heads replaces a plurality of such prior art attachment heads.

Additionally, it should be noted that the removable, interchangeable, and replaceable cutting element insert mounting on the forward cutting end of each such slide extension member by easily operable fastening means provides a decided advantage over welded-in-place prior art cutting element inserts which are not as easily interchanged and/or replaced.

With the above points in mind, it is an object of the present invention to provide a novel adjustable-cutting-radius rotary cutting tool attachment head which has any or all of the advantages referred to herein, including any or all of the features referred to herein, generically and/or specifically, and individually or in combination, and which is of relatively inexpensive construction adapted to be manufactured at relatively low cost, both with respect to initial tooling cost and the cost of production per unit item and which is virtually foolproof and almost universally adaptable in operation and capable of being driven by any of a great variety of different types of machine tools and/or metal working machines whereby to be conducive to widespread use of the adjustable-cutting-radius rotary cutting tool attachment head of the present invention for the purposes outlined herein and/or for any other substantially equivalent purposes.

Further objects are implicit in the detailed description which follows hereinafter (which is to be considered as exemplary of, but not specifically limiting, the present invention), and said objects will be apparent to persons skilled in the art after a careful study of the detailed description which follows hereinafter, and all such implicit objects are intended to be included and comprehended herein as fully as if particularly defined and pointed out herein.

For the purpose of clarifying the nature of the present invention, one exemplary embodiment is illustrated in the hereinbelow-described FIGURE of the accompanying single drawing sheet and is described in detail hereinafter.

The exemplary single FIGURE shown on the accompanying drawing sheet comprises an exploded perspective view which is believed to fully illustrate the structure of the exemplary but non-specifically-limiting embodiment of the invention illustrated, and to also make quite clear its function and mode of operation in use.

In the exemplary but non-specifically-limiting form of the invention illustrated, a rotary base member, or main body, is generally designated by the reference numeral 10 and is provided with a shank 12 centrally symmetrically positioned on one side or one surface of the base member 10 (the rear side or surface thereof as shown in the FIGURE) and extends outwardly therefrom in a direction substantially perpendicular to both of the surfaces of the rotary base member and the cutting plane of the complete adjustable-cutting-radius rotary cutting tool attachment head when fully assembled and power-rotated by coupling a machine tool or metal working machine to the shank or shaft 12 and rotating same around the center of rotation or the central axis of rotation, which is indicated in broken lines at 14 in the FIGURE.

It should be understood that the cutting plane referred to above is essentially parallel to the two surfaces of the rotary base member 10 and perpendicular to the center or central axis of rotation 14, and for purposes of simplicity the cutting plane is not illustrated on the FIGURE.

The rotary base member 10 is adapted to be provided with one or more slide extension members, with each such slide extension member having a forward cutting end provided with a cutting insert tip member of extremely hard material, such as tungsten carbide or the like, and with each such slide extension member being mounted in a corresponding slideway means of the base member and coupled to, and adapted to be driven by, a corresponding controllably operable slide-driving means.

In the exemplary but non-specifically-limiting form of the invention illustrated, there are two such slide extension members, each generally designated by the reference numeral 16, and each mounted in a corresponding slideway, such as is generally designated in each case by the reference numeral 18, carried, respectively, in parallel positions spaced apart by substantially the complete rotary base member or main body 10 and with each of the slide extension members 16 being adapted to slide in a corresponding different one of two spaced, parallel planes and in opposite directions relative to the center or central axis of rotation 14 of the rotary base member 10. Of course, each of the slide extension members 16 will normally be locked in a selected adjusted position of similar extension or retraction relative to the central axis of rotation 14 prior to having the shank or shaft 12 power-rotated by a machine tool or a metal working machine. This will be accomplished by locking means which will be described hereinafter.

In the exemplary but non-specifically-limiting arrangement illustrated, each of the slide extension members 16 has an outwardly directed forward cutting end 19 which is removably, interchangeably, and replaceably provided with a corresponding cutting insert element 20 of extremely hard material, such as tungsten carbide or the like, and which, in the exemplary but non-specifically-limiting form of the invention illustrated is removably mounted on the corresponding forward cutting end 19 of the corresponding slide extension member 16 by the corresponding fastening means 22 which is shown as comprising merely a fastening screw which is adapted to extend through a hole (not shown) in the substantially triangularly shaped cutting element insert 20 and to be retainingly threaded into a corresponding interiorly threaded hole (not shown) extending inwardly into the corresponding forward cutting end 19 of the corresponding slide extension member 16. The arrangement is such that each such extremely hard cutting insert element 20 can be easily removed and replaced as desired.

In the exemplary but non-specifically-limiting form of the invention illustrated, each of the two parallel, oppositely positioned slideway means 18 carried by the rotary base member or main body 10 is of what might be termed a dovetailed type having a longitudinal groove 26 defined in the corresponding top edge and bottom edge (as shown in the FIGURE) initial surfaces of the rotary base member 10 which laterally terminate in, and are limited by, undercut upstanding retaining flanges 28 on each side of the longitudinal, dovetailed type undercut groove 26 comprising each of the two similar slideway means 18. The corresponding slidably cooperating portion of the corresponding slide extension member 16 is similarly of a dovetailed, outwardly projecting flange type as is indicated at 30, with each of the outwardly projecting, dovetailed flange portions 30 being adapted to fit into the angular, outwardly directed grooves 32 at the outer sides of the undercut dovetailed groove 26 so as to provide for full retention of the portions 30 under the undercut flanges 28 but in a manner which allows tangential extension and retraction of the corresponding slide extension member 16 in response to operation of the slide-driving means which will be described immediately hereinafter.

The slide-driving means referred to above in the exemplary but non-specifically-limiting form of the invention, takes the form of rotary-to-linear movement converting or conversion gear means which also is shown as effectively comprising a reduction gear means and may be said to be generally designated in part by the reference numeral 34 in the FIGURE wherein it is shown as comprising a small input gear 36 and a second somewhat larger intermediate output gear, indicated at 38, which is normally driven by the input gear 36 when the device is fully assembled. The slide-driving means 34 also includes two toothed racks, such as the representative one shown at 40 in the FIGURE (it being understood that the underside of the upper slide extension member 16 is provided with a similar toothed rack 40 which cannot be seen in the FIGURE) which is adapted to be engaged with corresponding upper and lower portions of the second intermediate output gear 38 whereby to be simultaneously and oppositely tangentially extended or retracted in response to rotation of the smaller input gear 36 in an extension or retraction direction.

It will be noted that the input gear 36 is provided with a manually operable knob 42 bearing a scale means 44 on its outer face which cooperates with a corresponding index means or marking 46 on the near surface of the rotary base member 10 when the entire device is fully assembled. The scale means 44 may be calibrated in any suitable type measurement indicia, but is shown as being calibrated in .001 inch increments so that rotation of the knob 42 in a manner which causes the scale means 44 to rotate .001 inch, for example, relative to the fixed indicia means or marker 46, will cause a corresponding extension if the rotation is clockwise and will cause a corresponding retraction if the rotation is counterclockwise, of the forward cutting end 19 and cutting insert element 20 of each of the two slide extension members 16 relative to the center, or central axis of rotation 14, of the complete, fully assembled device.

Since the manually operable knob 42 is adapted to lie flush within the recess 48 of the rotary base member 10 when the device is fully assembled, it cannot be grasped for rotation, and this is effected by providing a torque-transmitting means on the knob 42 adapted to have torque transmitted therethrough to the knob 42 and the input gear 36 in response to the manual operation of an outwardly extending tool temporarily engaging the torque-transmitting means. In the exemplary but non-specifically-limiting form of the invention illustrated, the tool-engageable, torque-transmitting means just referred to is indicated at 50 and merely comprises a hexagonally shaped socket or recess adapted to receive the end of a corresponding wrench of the type usually known in the art as an "Allen' wrench, or any other substantial equivalent, which can then be exteriorly manually turned in either a clockwise direction for causing effective cutting-radius extension of the forward cutting ends 19 of the two slide extension members 16, or in a counterclockwise direction for causing cutting-radius retraction of the forward cutting ends 19 of the two slide extension members 16.

After such adjustment of each of the two cutting radii of the two forward cutting ends 19 of the two slide extension members 16 has been effected, the "Allen" wrench, or other tool, is removed from the torque-transmitting hexagonal socket 50 so that the surface of the rotary base member 10 is completely smooth and flush and has no projection extending therefrom, which is necessary when the entire device is used as a cutting tool for actually cutting a work piece.

The locking means generally referred to hereinbefore, is illustrated in the FIGURE in one exemplary but non-specifically-limiting form and comprises a bifurcated portion 52 of the base member 10 immediately adjacent to and inwardly of the corresponding slideway means 18, with each such bifurcated portion 52 having a central slot or slit 54 between the two separated parts of the corresponding bifurcated portion 52 so that it will be readily understood that the two parts of each bifurcated portion 52 separated by each such slot 54 can be forcibly moved toward each other in a manner which effectively reduces the width of the slot 54 through the use of controllably operable constriction means for constricting the corresponding undercut side flange portions 28 of the corresponding slideway means 18 in a manner which will obviously frictionally engage the corresponding outwardly angularly directed dovetailed flange portions 30 carried by the corresponding slide extension member 16 and will thus firmly lock each such slide extension member 16 in whatever adjusted position it is in at the time of such constriction of each such bifurcated portion 52.

The constriction means, and the constriction, just referred to, in the exemplary but non-specifically-limiting form of the invention illustrated, effectively comprises and is accomplished through the use of four similar locking screws, such as the exemplary one shown at 56 in the FIGURE aligned with the left uppermost, interiorly threaded receiving hole 58 of the base member 10. Of course, it should be understood that the other three holes comprising the right uppermost hole 58 and the right lowermost hole 58 and the left lowermost hole 58, are similarly interiorly threaded and similarly provided with exteriorly threaded locking screws similar to the exemplary one shown at 56, and the only reason that three of the locking screws are omitted from the FIGURE of the drawing is to avoid unnecessary complexity therein, and, furthermore, it is not believed necessary, in view of the fact that an exemplary one of the four exteriorly threaded locking screws 56 is shown, and, therefore, clearly provides an adequate disclosure of the other three not shown.

It will be understood that, when the four exteriorly threaded locking screws 56 are tightened in the four interiorly threaded bores or holes 58, a constriction force is applied to each of the two bifurcated portions adjacent to each of the two slideways 18, and thus, effectively locks each of the two slide extension members 16 in any particular adjusted position in the manner described hereinabove. Then the complete, fully assembled rotary cutting tool attachment head can have the shank or shaft portion 12 thereof either coupled to a machine tool or metal working machine if it has not already been so engaged, and the machine tool or metal working machine can be operated so as to power-rotate the shank or shaft 12 and the complete rotary cutting tool attachment head for effecting a desired cutting operation.

Upon completion of one cutting operation, if a change in effective cutting radius is desired, all that is necessary to do is to loosen the four locking screws 56, to insert an "Allen' wrench in the recess 50, and to turn the knob 42 and the scale means 44 with respect to the index means 46 until a desired positive or negative incremental movement (either extension or retraction) of the two slide extension members 16 has been effected, after which the "Allen' wrench can be removed from the socket 50, and the four locking screws 56 can again be retightened so as to lock each of the two slide extension members 16 in the newly adjusted position, and the complete device can again be power-rotated for performing a desired cutting operation.

An insert ring member 60 of an appropriate shape is adapted to be inserted over a hub portion 62 carried by the previously mentioned second or intermediate gear 38 and to be inserted into the large recess 64 in the near face of the rotary base member 10 when the entire device is assembled from the exploded relationship shown in the FIGURE of the drawing, and the various elements are adapted to be retained in the fully assembled relationship by the provision of a pair of aligned and, therefore, self-locking holding screws 66, which screw into an interiorly threaded hole 68 and into edge-abutment with the insert ring 60 for locking it in assembled relationship.

An additional holding screw 70 is adapted to be received within a corresponding threaded hole 72 and to retainingly extend into an annular groove 74 between the gear 36 and the knob 42, whereby to finish the complete assembly of the exemplary form of the device shown in exploded form in the FIGURE of the drawing.

It should be noted that a single driving gear adapted to be exteriorly operated in the manner of the small gear 36 may be used in lieu of the two gears 36 and 38, and said single driving gear may be coupled to the two toothed racked portions 40 of the two slide extension members 16 for direct and simultaneous extension and/or retraction thereof. However, the double-gear arrangement illustrated in the FIGURE, including the small input gear 36 and the larger intermediate gear 38, provides an effective reduction gearing and facilitates the manual adjustment of the cutting radii of the two forward cutting ends 19 of the two slide extension members 16.

It should also be noted that various other forms of locking means may be employed in lieu of the exemplary locking means illustrated in the FIGURE of the drawing and described in detail hereinbefore.

In other words, both the slide-driving means and the locking means and, for that matter, the number and type of slide extension members, may be modified within the broad scope of the present invention, and all such modifications are intended to be included and comprehended herein as fully as if described, illustrated, and specifically claimed herein.

It should be understood that the FIGURES and the specific description thereof set forth in this application are for the purpose of illustrating the present invention and are not to be construed as limiting the present invention to the precise and detailed specific structure shown in the FIGURES and specifically described hereinbefore. Rather, the real invention is intended to include substantially equivalent constructions embodying the basic teachings and inventive concept of the present invention.

I claim:

1. An adjustable-cutting-radius rotary cutting tool attachment head comprising: a rotary base member having a shank substantially centrally symmetrically positioned on one side thereof and with said rotary base member effectively lying across a longitudinal axis of rotation of said shank in a cutting plane transverse thereto and having a center aligned with said axis of rotation of said shank, said rotary base member being provided with at least one peripherally mounted slide extension member having a forward cutting end adapted to be provided with a cutting insert tip member and slidably tangentially mounted for movement with respect to the center of said base member and said shank in a manner effectively modifying the radial distance between said forward cutting end of said slide extension member and said center of said base member and said shank whereby to either increase or decrease said radial distance; and slide-driving means taking the form of rotary-to-linear movement converting means having an output portion effectively drivingly connected with respect to said slide extension member for positively slidably moving it in said radius-increasing manner or said radius-decreasing manner and having a manually operable input portion controllably operable for extending or retracting said slide extension member corresponding radius-modifying positive and negative distances, said rotary-to-linear movement converting means comprising gear means, with said manually operable input portion taking the form of a driving input gear of said gear means having a tool-engageable torque-transmitting means adapted to be engaged by a removable auxiliary torque-applying tool and manually rotated thereby, said output portion comprising a driven intermediate and output gear of said gear means engaged by and driven by said driving input gear, and further comprising a toothed rack carried along a longitudinal surface of said slide extension member and in driven engagement with said intermediate and output gear.

2. Apparatus as defined in Claim 1, including controllably lockable and unlockable locking means for controllably releasably locking said slide extension member in any selected position with respect to said base member.

3. Apparatus as defined in Claim 1, wherein said manually operable input portion of said rotary-to-linear movement converting means has a micrometer means coupled thereto and provided with scale and index means calibrated in small linear measurement increments of a desired type whereby to indicate in response to manual operation of said input portion radius-modifying positive and negative incremental distances corresponding to the actual extension or retraction of said slide extension member.

4. Apparatus as defined in Claim 1, wherein said base member and said slide extension member are provided with cooperating longitudinal tangentially directed slideway means.

5. Apparatus as defined in Claim 1, wherein said base member and said slide extension member are provided with cooperating longitudinal tangentially directed slideway means of a dovetailed type.

6. Apparatus as defined in Claim 2, wherein said locking means comprises a bifurcated portion of said base member defining a slot therebetween in a plane substantially transverse to said shaft and provided with controllably operable constriction means for constricting said bifurcated portion of said base member whereby to effectively reduce the width of said slot as adjacent portions of the bifurcated part of said base member are forced toward each other whereby to effectively lock said slide extension member in a manner effectively immobilizing same until said constriction means is effectively loosened.

7. Apparatus as defined in Claim 2, wherein said locking means comprises a bifurcated portion of said base member defining a slot therebetween in a plane substantially transverse to said shaft and the axis of rotation of said rotary-to-linear movement converting means and provided with controllably operable constriction means for constricting said bifurcated portion of said base member whereby to effectively reduce the width of said slot as adjacent portions of the bifurcated part of said base member are forced toward each other whereby to effectively lock said slide extension member and said rotary-to-linear movement converting means in a manner effectively immobilizing same until said constriction means is effectively loosened.

8. Apparatus as defined in Claim 1, wherein said forward cutting end of said slide extension member is provided with fastening means for detachably connecting an extremely hard cutting insert tip member thereto in a controllably removable and interchangeable manner.

9. Apparatus as defined in Claim 1, wherein the rotary base member is provided with two oppositely positioned substantially parallel and oppositely tangentially directed slideway means and is further provided with two of said slide extension members slidably mounted in corresponding ones of said two slideway means in tangentially oppositely directed relationship and with each of said slide members having a similar one of said toothed rack members on the inner surface thereof in engagement with an opposite portion of said intermediate output gear of said rotary-to-linear movement converting means whereby to cause said two slide extension members to be identically extended or retracted along parallel spaced planes in opposite directions in response to operation of said manually operable input portion of said rotary-to-linear movement converting means of said slide-driving means in a manner such that the oppositely directed forward cutting end of each of said slide extension members will correspondingly modify the radial distance therefrom to the center of said base member and consequently the diameter between the two forward cutting ends of said two slide extension members in response to adjusting operation of said input portion of said slide-driving means.